US012590687B2

(12) United States Patent
Crompvoets et al.

(10) Patent No.: US 12,590,687 B2
(45) Date of Patent: Mar. 31, 2026

(54) LIGHTING ELEMENT

(71) Applicant: LUMILEDS LLC, San Jose, CA (US)

(72) Inventors: Floris Crompvoets, Aachen (DE); Benno Spinger, Aachen (DE)

(73) Assignee: Lumileds Singapore Pte. Ltd., Singapore (SG)

( * ) Notice: Subject to any disclaimer, the term of this patent is extended or adjusted under 35 U.S.C. 154(b) by 0 days.

(21) Appl. No.: 18/949,019

(22) Filed: Nov. 15, 2024

(65) Prior Publication Data

US 2025/0164094 A1 May 22, 2025

(30) Foreign Application Priority Data

Nov. 16, 2023 (EP) .................................... 23210260

(51) Int. Cl.
*F21S 43/20* (2018.01)
*F21S 43/14* (2018.01)
(Continued)

(52) U.S. Cl.
CPC ......... *F21S 43/26241* (2024.05); *F21S 43/14* (2018.01); *F21S 43/31* (2018.01); *F21S 43/401* (2024.05); *F21W 2104/00* (2018.01)

(58) Field of Classification Search
CPC .... F21S 43/26241; F21S 43/401; F21S 43/31; F21S 43/14; F21S 43/4641; F21S 43/236; F21S 43/237; F21S 43/249; F21S 43/239; F21S 43/241; F21W 2104/00; B60R 19/52; B60R 19/525; B60R 19/527; B60R 2019/52; B60R 2019/525; B60R 2019/527; B60R 13/005
See application file for complete search history.

(56) References Cited

U.S. PATENT DOCUMENTS

2013/0051048 A1 2/2013 Stein
2016/0061389 A1* 3/2016 Dong .................... F21V 7/0025 362/327
(Continued)

FOREIGN PATENT DOCUMENTS

CN 211176644 U * 8/2020 ........... B60R 13/005
EP 2327927 A1 6/2011
(Continued)

OTHER PUBLICATIONS

Extended European Search Report dated Mar. 12, 2024 for European Patent Application No. 23210260.8.

*Primary Examiner* — Erin Kryukova
(74) *Attorney, Agent, or Firm* — Volpe Koenig

(57) ABSTRACT

Lighting element in particular for an automobile, comprising a mixing box comprising a backwall and sidewalls extending from the backwall, at least one light emitting element, extending through an opening of the backwall, and a diffusor connected to the mixing box opposite to the backwall and having a front face facing away from the backwall and an opposite back face facing in the direction of the backwall, wherein the diffusor receives light from the at least one light emitting element via its back face and emits light via its front face, wherein the back face of the diffusor extends towards the backwall of the mixing box, wherein the extension of the back face is asymmetrical along at least one lateral direction and the back face is distant of the backwall.

17 Claims, 5 Drawing Sheets

Figure 1:
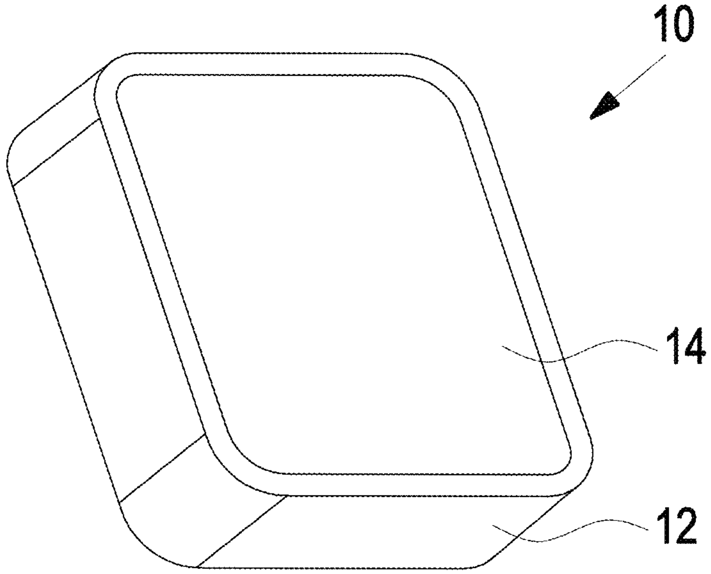

(51) Int. Cl.

| | |
|---|---|
| ***F21S 43/31*** | (2018.01) |
| ***F21S 43/40*** | (2018.01) |
| ***F21W 104/00*** | (2018.01) |

(56) References Cited

U.S. PATENT DOCUMENTS

| | | | | |
|---|---|---|---|---|
| 2018/0345846 | A1* | 12/2018 | Alisafaee | F21S 43/31 |
| 2019/0001878 | A1* | 1/2019 | Schneider | G09F 21/049 |
| 2019/0301702 | A1 | 10/2019 | Crompvoets et al. | |
| 2023/0304644 | A1 | 9/2023 | Spinger et al. | |

FOREIGN PATENT DOCUMENTS

| | | | | |
|---|---|---|---|---|
| EP | 2636947 | A2 | 9/2013 | |
| EP | 3825601 | A1 | 5/2021 | |
| RU | 56289 | U1 | 9/2006 | |
| WO | WO-2020057675 | A1 * | 3/2020 | F21S 43/50 |

* cited by examiner

LIGHTING ELEMENT

The present invention relates to a lighting element, in particular for an automobile.

There is a trend in automotive lighting applications to illuminate the grill of a car. With the advent of electric cars, the need for a grill with openings to cool the combustion engine is not needed anymore and a closed grill surface offers an opportunity to integrate light sources. Car makers use this to make signature lighting designs to connect a certain lighting appearance with a brand. A car maker has a need for a flexible light source that can be used for such lighting designs.

However, the building space at the front grill of a car is limited in particular in its depth. In particular Lambertian emitters, such as light emitting diodes (LED), require a certain spatial extend in order to create a uniform luminance appearance of the emitted light. This spatial extend for lighting elements of the prior art is often not sufficient in order to create the required uniform luminance appearance.

It is an object of the present invention to provide a lighting element which is compact and provides a uniform luminance appearance.

The problem is solved by a lighting element according to claim 1.

The lighting element according to the present invention, in particular for an automobile and more preferably for a signature light at a front grill of a car, provides a mixing box comprising a backwall and sidewalls extending from the backwall. Further, the lighting element comprises at least one light emitting element extending through an opening of the backwall. Therein, the at least one light emitting element may extend into the mixing box, i.e. the light emitting surface of the at least one light emitting element extends beyond the backwall of the mixing box along the direction of light. Alternatively, the light emitting surface of the at least one light emitting element flushes with the backwall of the mixing box.

Further, the lighting element comprises a diffusor connected to the mixing box opposite to the backwall. In particular, the diffusor is connected to the sidewalls of the mixing box. The diffusor comprises a front face facing away from the backwall and an opposite back face facing in the direction of the backwall, wherein the diffusor receives the light from the at least one light emitting element via its back face and emits the light via its front face. Therein, the diffusor might comprise a transparent matrix such as transparent silicone and a scatterer such as scattering particles. In particular, the scattering particles are made from $TiO_x$. By the scatterers, light of the at least one light emitting element is diffused and homogenized over the complete front face of the diffusor. Thus, by the two-dimensional shaped diffusor placed on top of the Lambertian emitting light emitting element, the requirements of a compact lighting element with uniform luminance appearance is achieved which can be used as lighting element to illuminate the front grill of a car.

Preferably, the back face of the diffusor is extending towards the backwall of the mixing box, wherein the extension of the back face is asymmetrical along at least one lateral direction. Therein, the lateral direction is referring to a direction parallel to the front face of the diffusor or perpendicular to the direction of light emission of the at least one light emitting element. In other words, the lateral direction is parallel to the light emitting surface of the at least one light emitting element. Therein, the back face of the diffusor may be distant from the backwall such that a cavity or hollow space is created between the diffusor and the backwall of the mixing box. Thus, by the asymmetrically shaped back face of the diffusor, homogenous distribution of the light of the at least one light emitting element is possible such that a uniform luminance appearance at the front face of the diffusor is present. Therein, by the asymmetric back face of the diffusor tailored light distribution by the diffusor is feasible in order to achieve the required uniform luminance appearance. Therein, it was surprisingly found by the inventors of the present invention that the asymmetry in the design of the diffusor improved the uniform luminance appearance contrary to a completely symmetric designs of the prior art. The asymmetry induced by the diffusor camouflages the visual inhomogeneity, i.e. the inhomogeneity perceived by the human eye. Since the human visual system is sensitive for repetitive/periodic patterns, asymmetry reduces the occurrence of these patterns and hence the effect of the homogeneity for the naked eye is enhanced. In other words, the asymmetry of the diffusor leads to an asymmetry of the emission of the lighting element. However, by the human eye this asymmetry is perceived as homogenous luminance of the lighting element, wherein a symmetric emission pattern would still be perceived as inhomogeneous.

Preferably, the at least one light emitting element is built as light emitting diode (LED) proving a Lambertian emission which is shaped by the diffusor in a uniform luminance appearance.

Preferably, the lighting element comprises two or more light emitting elements, wherein at least two light emitting elements emit light with different color. Hence, a dual color or multiple color lighting element is provided, wherein by the diffusor light of the two or more light emitting elements are distributed such that for the two or more light emitting elements, arranged laterally next to each other, still a uniform luminance appearance is present on the front face of the diffusor irrespective of the source of the light and its color.

Preferably, the front face of the diffusor is flat. Despite the complex shaped back face of the diffusor, by the flat front face of the diffusor a pleasing appearance of the lighting element is provided, and the lighting element can be easily implemented in surfaces of an automobile.

Preferably, the diffusor comprises a stub extending from the back face of the diffusor towards the at least one lighting element. By the stub, the main direction of light emission of the at least one light emitting element is covered. Scatterers in the stub scatter away this light in order to prevent bright spots at the front face of the diffusor above the at least one light emitting element which would otherwise lead to a visible inhomogeneity of the luminance.

Preferably, the stub is integrally formed with the diffusor.

Preferably, the stub is from the same material as the diffusor.

Preferably, the end of the stub opposite to the front face of the diffusor's front face is place in a distance of between 0.1 mm and 5 mm from the light emitting surface of the at least one light emitting element and preferably between 0.5 mm and 2 mm.

Preferably, the stub is not in direct contact with the light emitting surface of the at least one light emitting element.

Preferably, the stub has a rectangular shape. In particular, the shape of the stub corresponds substantially to the shape of the light emitting surface of the at least one light emitting element. If there are more than one emitting element, the shape of the stub corresponds to the cumulated area of the light emitting surfaces of all light emitting elements.

Preferably, the cross-sectional area of the stub is between 0.8 to 1.5 times the area of the light emitting surface of the at least one light emitting element. More preferably, the sectional area of the stub is between 1 and 1.2 times the area of the light emitting surface of the at least one light emitting element. If the lighting element comprises more than one light emitting element, the cross-sectional area relates to the cumulative area of the light emitting surfaces of all light emitting elements.

Preferably, the cross-sectional area of the stub is larger than the light emitting surface of the at least one light emitting element. If the lighting element comprises more than one light emitting element, the cross-sectional area of the stub is larger than the combined areas of the light emitting surfaces of all light emitting elements. Thereby, it is ensured that the light of the one or more light emitting element in the main direction of emission is received by the stub and evenly distributed by the diffusor. Thus, bright spots in the emission of the lighting element are prevented.

Preferably, the stub has a recess directly above the light emitting surface of the at least one light emitting element. In particular for more than one light emitting element, the recess may have the size of the cumulative area of the light emitting surfaces of all light emitting elements. By the recess, side walls of the stub are created extending in the direction of the one or more light emitting element that serve as mixing extension mixing the lights of in particular more than one light emitting element preventing bright spots of either one of the more than one light emitting element.

Preferably, the height of the lighting element is smaller than 10 mm and preferably smaller than 5 mm. Compared to the prior art, by the shape of the diffusor, the height can be sufficiently reduced in order to be implemented in a front grill of an automobile or adapted to the specific application. The extension of the lighting element in the direction of emission, i.e. the height of the lighting element, is sufficient to provide a uniform luminance appearance of the lighting element.

Preferably, the backwall of the mixing element is non-flat. Thus, by the backwall of the mixing element light scattered from the diffusor towards the backwall can be redirected. In particular, by the non-flat backwall of the mixing box, homogenous distribution of the diffusor can be supported reducing the complexity of the shape of the diffusor. Hence, distribution of the light in the lighting element is supported by the backwall of the mixing box.

Preferably, the backwall of the mixing box is reflective such that light scattered back from the diffusor is reflected again towards the diffusor to contribute to the emission of the lighting element.

Preferably, the side wall of the mixing box are reflective such that light scattered back from the diffusor is reflected again towards the diffusor to contribute to the emission of the lighting element.

Preferably, the emission of the front face of the lighting element is non-symmetric. As described above, it has been found that the non-symmetric emission of the lighting element camouflages the visual inhomogeneity, i.e. the inhomogeneity perceived by the human eye. Since the human visual system is sensitive for repetitive/periodic patterns, asymmetry reduces the occurrence of these patterns and hence the effect of the homogeneity for the naked eye is enhanced. In other words, the asymmetry of the diffusor leads to an asymmetry of the emission of the lighting element. However, by the human eye this asymmetry is perceived as homogenous luminance of the lighting element, wherein a symmetric emission pattern would still be perceived as inhomogeneous.

Preferably, the emission of the front face of the lighting element is perceived by an observer as symmetric and/or homogeneous.

Preferably, the extension of the back face of the diffusor is symmetric along a diagonal mirror plane. Hence, in particular since the extension of the back face of the diffusor is developed by an optimization process, introducing a diagonal mirror plane reduces a complexity of the optimization problem. However, despite the diagonal mirror plane of the extension of the backwall, the extension of the back face is still asymmetrically along at least one lateral direction as described before.

Preferably, the extension of the back face is asymmetrically along two or more and preferably all lateral directions. Hence, if the diffusor comprises a diagonal mirror plane, the extension of the back face is symmetrically along the diagonal direction. However, if no diagonal mirror plane is implemented, the extension of the back face of the diffusor may be asymmetrical along all lateral directions.

Preferably, the extension of the back face is defined by one or more splines. Thus, the back face is shaped as freeform surface described by the one or more splines. Preferably, five splines are used to describe the back face in the case that a diagonal mirror plane is implemented. Instead, eight splines might be used in order to describe the shape of the back face. Therein, the one or more splines may be evenly distributed. In the case of eight splines, these splines may have a distance in the lateral plane of 45°. Other distributions of course can also be selected.

Preferably, the shape of the splines is determined by an optimization process. Therein, the one or more splines are optimized towards a uniform luminance appearance. Optimization can be performed by commercially available tools and may implement a least square algorithm or the like. However, the present invention is not specifically limited to the used optimization algorithm.

In the following, the present invention is described in more detail with reference to the accompanying figures.

Figure 2:
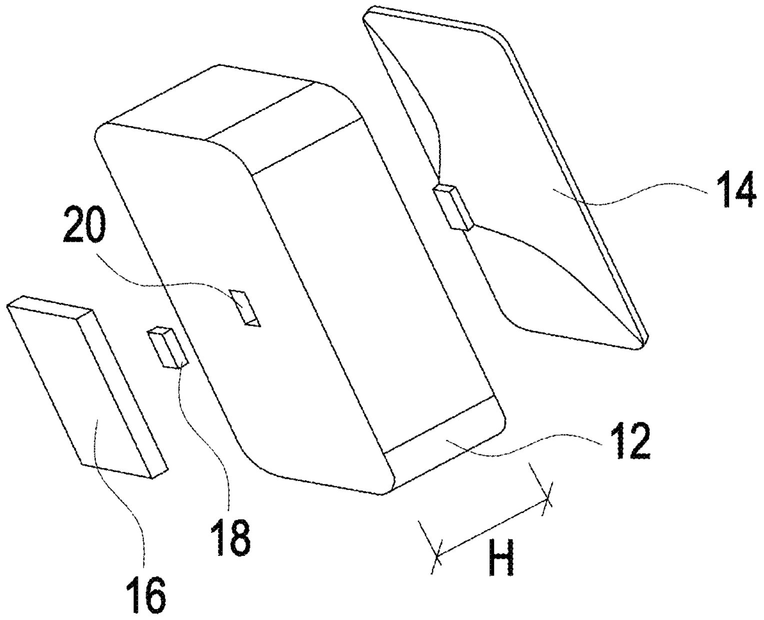
Figure 3:
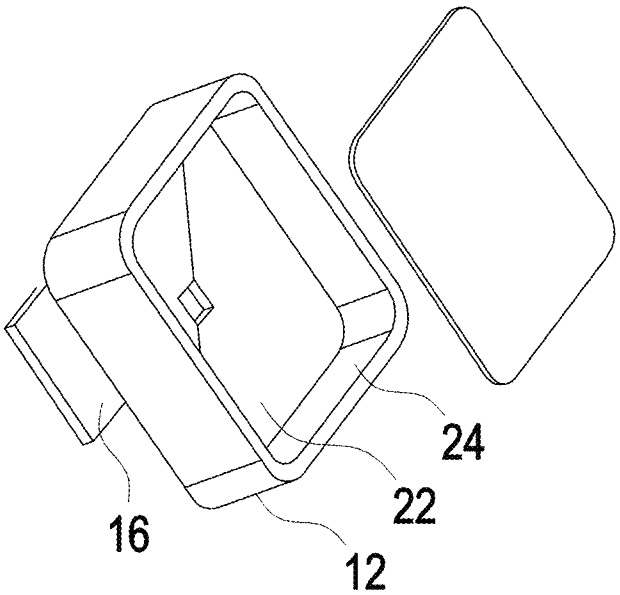
Figure 4:
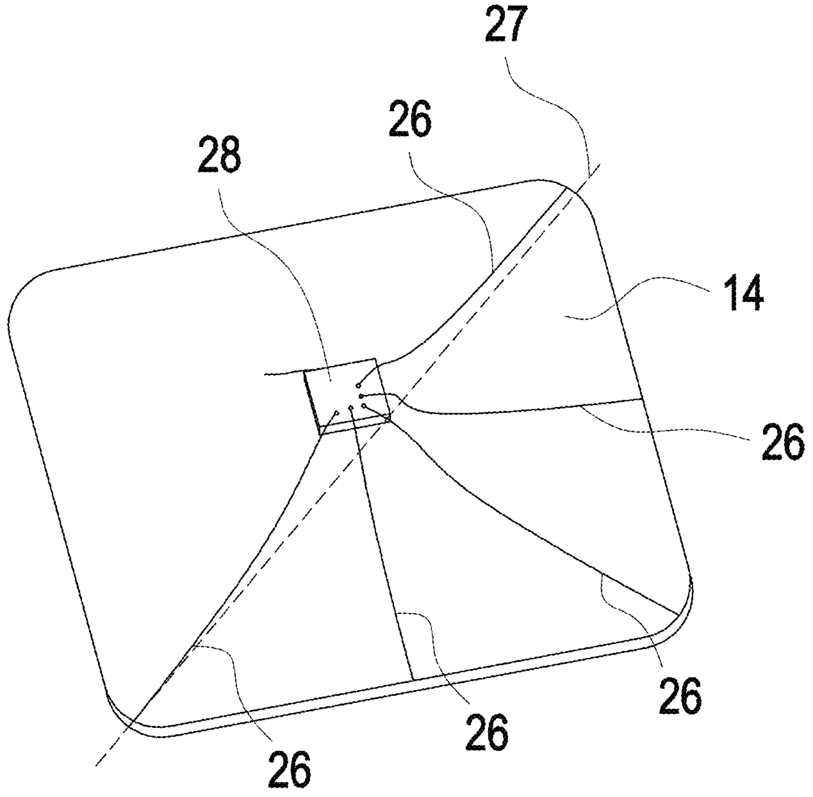
Figure 5:
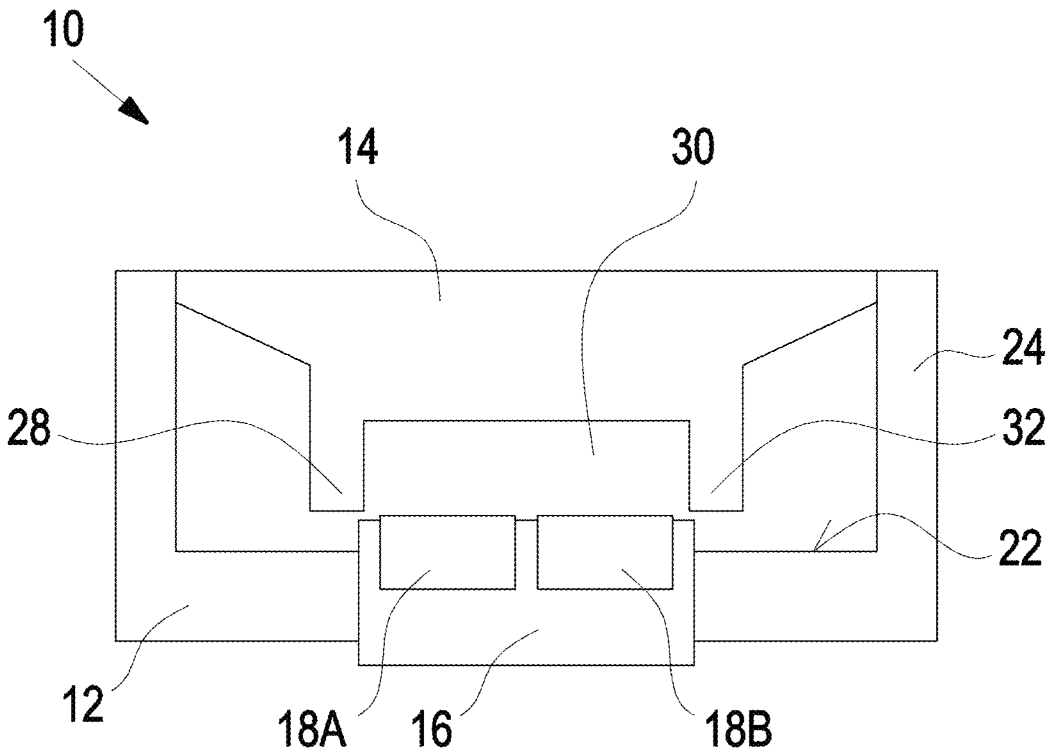
Figure 6:
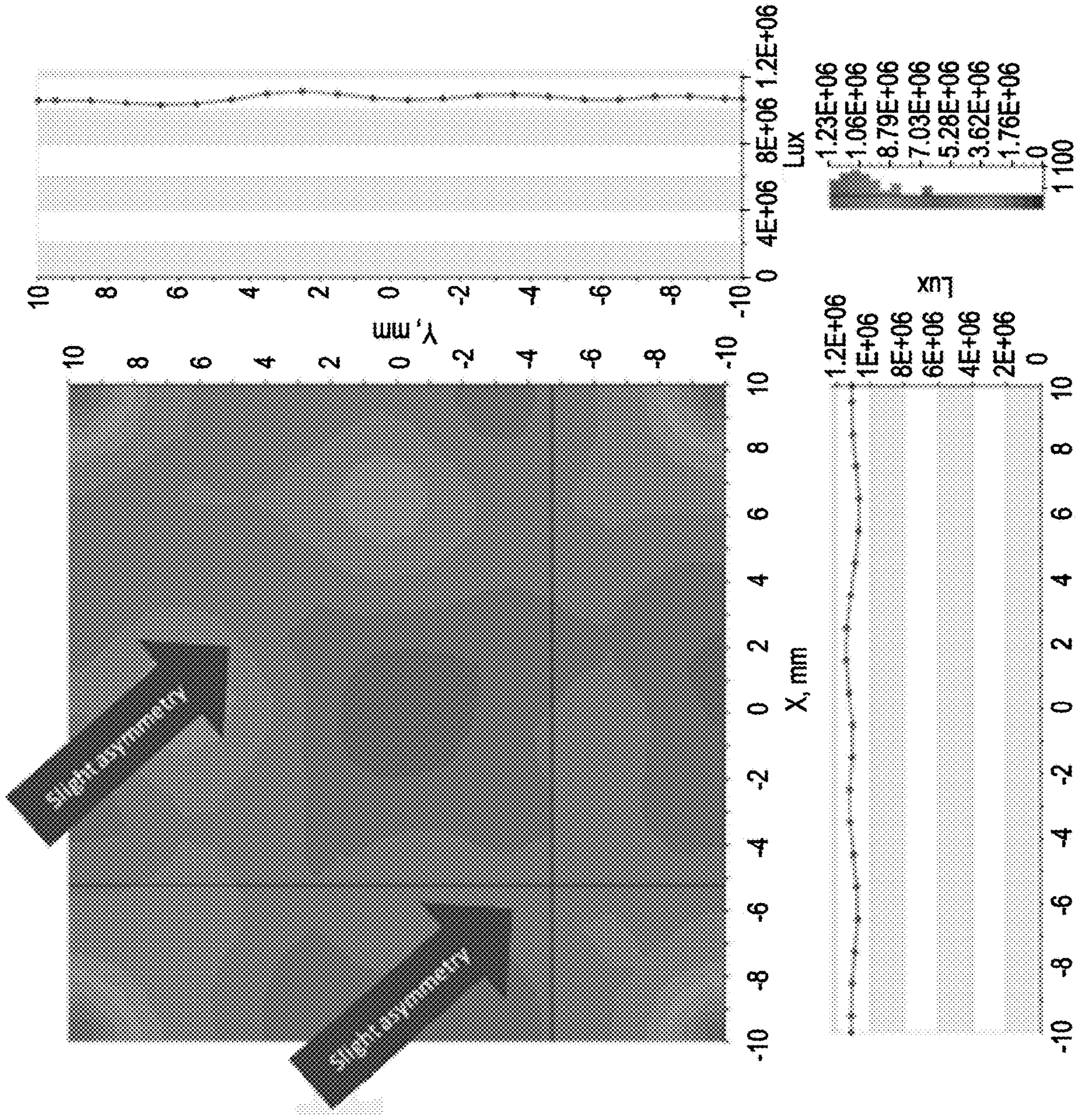
Figure 7:
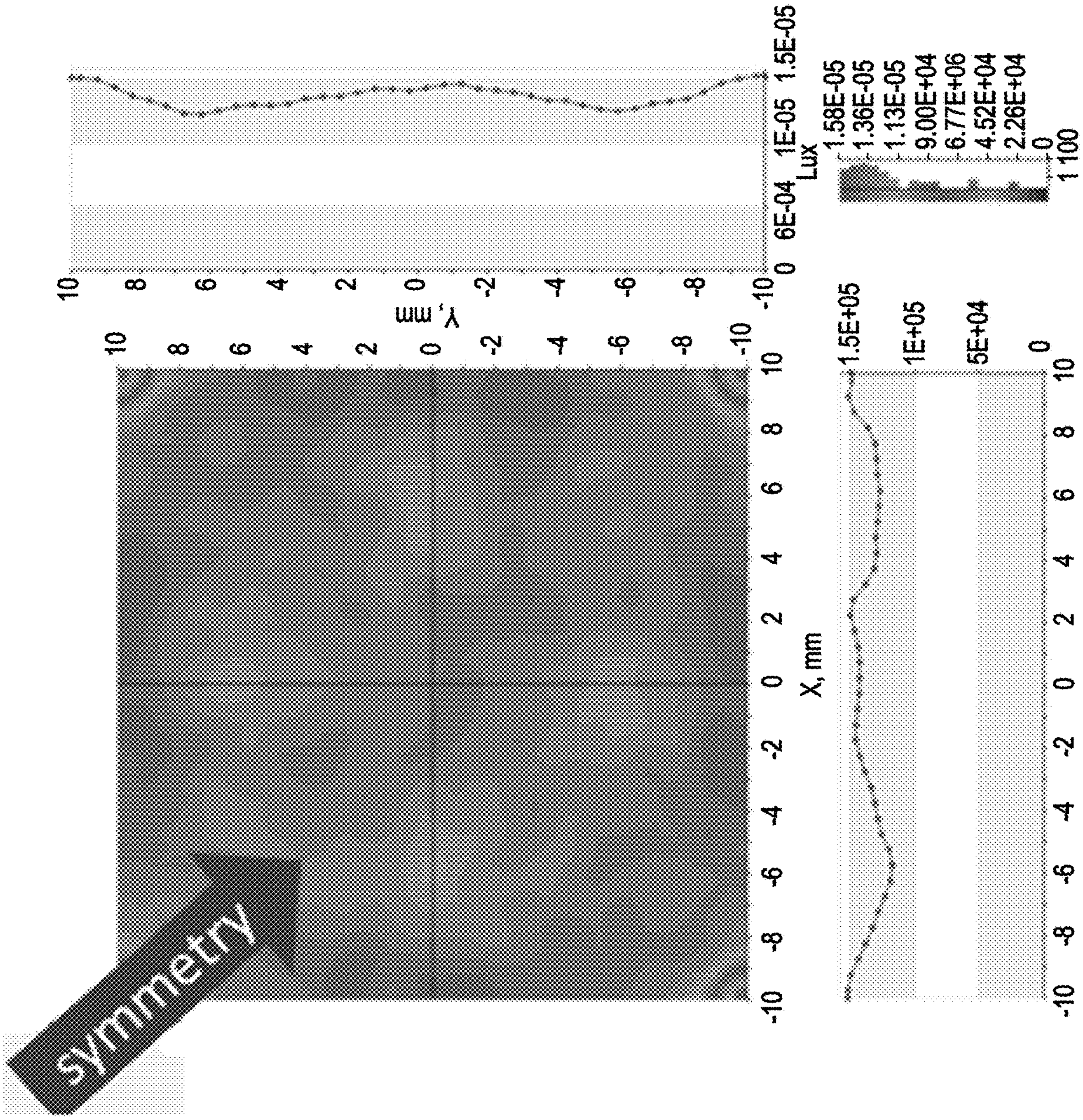

The figures show:

FIG. 1 a lighting element according to the present invention,

FIG. 2 an exploded view of the lighting element of FIG. 1 in a first perspective and FIG. 3 an exploded view of the lighting element of FIG. 1 in a second perspective, FIG. 4 back face of the diffusor according to the present invention, FIG. 5 another embodiment of the present invention, FIG. 6 an emission of the lighting element and FIG. 7 an emission of the lighting element.

The lighting element 10 according to the present invention as shown in FIGS. 1 to 3 comprises a mixing box 12, as well as a diffusor 14. Therein, the diffusor 14 is connected to the mixing box 12. The diffusor 14 has a flat front face and a complex shaped back face as shown for example in FIGS. 2 and 4 and described in more detail below. The mixing box 12 comprises side walls 24 extending from a backwall 22. Therein, the backwall 22 is complex shaped in order to support the light distribution and homogenization of the light in order to create a uniform luminance appearance of the lighting element. Thus, backwall 22 and/or sidewalls 24 may be reflective. A light emitting element 18 is extending through an opening 20 in the backwall 22 of the mixing box 12 into the volume created by the mixing box 12 and the diffusor 14. The lighting element 18 may be arranged on an interposer 16 or PCB. Light from the light emitting element 18 is emitted in a direction towards the front face of the diffusor 14. Light scattered back from the diffusor 14 may be reflected at the backwall 22 and/or sidewalls 24 of the mixing box.

In the following it is referred to FIG. 4 showing the back face of the diffusor 14. The diffusor 14 has a stub 28, wherein the end face of the stub 28 is placed directly above the at least one light emitting element 18. Therein, the area of the stub 28 is preferably larger than a light emitting surface of the at least one light emitting element 18. By the stub 28, more material of the diffusor 14 including scatterers is present in the main direction of emission of the at least one light emitting element 18. Hence, sufficient distribution of this light in the main direction of emission is feasible by the additional material of the stub 28 in order to avoid bright spots at the front face of the diffusor 14 directly above the light emitting element 18. Therein, the cross-sectional shape of the stub 28 may correspond to the shape of the light emitting surface of the at least one light emitting element 18. If more than one light emitting elements 18 are implemented in the lighting element, the shape of the stub 28 can be adapted correspondingly.

The back face of the diffusor 14 is built as freeform surface. Therein, the extension of the back face of the diffusor 14 may be asymmetrical along at least one lateral direction. Therein, the lateral direction is parallel to the front face of the diffusor 14. As shown in FIG. 4, the extension of the back face of the diffusor 14 is shaped by five indicated splines 26. Further, the shape of the extension of the back face is symmetric along a diagonal mirror plane 27. Hence, the back face of the diffusor 14 is described by five splines in the example of FIG. 4. However, other descriptions are also possible, i.e. use of eight splines 26 to describe the extension of the back face of the diffusor 14. Therein, the shape of the splines 26 may be determined by an iterative optimization process in order to optimize the emitted uniform luminance appearance at the front face of the diffusor. Therein, each spline 26 in the example of FIG. 4 may be different and describe a different shape determining the extension of the back face of the diffusor 14. The emission of the lighting element is exemplified in FIGS. 6 and 7. FIG. 6 shows an emission spectrum having a slight asymmetry in the distribution as indicated by the arrows. However, it was found by the inventors of the present invention that a slight asymmetry will be perceived by the observer as a more uniform luminance appearance. Contrary, FIG. 7 shows a symmetric emission. As the human eye is trained and sensitive for repetitive or periodic patterns, the symmetry of FIG. 7 might be perceived by an observer and inhomogeneity of the luminance noticed due to the pattern recognition of the human eye. Contrary, in the inhomogeneous luminance as shown in FIG. 6, due to the asymmetry of the light distribution, the emission of the lighting element will be perceived as uniform luminance despite their slight imperfections. Hence, even with variation of the luminance in the range of 15% or less and preferably 10% or less, the emission will be recognized as uniform luminance due to the induced asymmetry. Thus, light homogeneity of the emissions of the lighting element are acceptable and do not disturb the appearance of the light emission. Thus, the lighting element can be built compact, and increasing the height H of the lighting element for a more homogeneous luminance can be prevented. Thus, a very compact lighting element with small building height H less than 10 mm and preferably less than 5 mm can be achieved still providing uniform luminance appearance.

Referring to FIG. 5 showing a dual color lighting element 10'. Therein, same or similar elements are indicated by the same reference number. The dual color lighting element 10' comprises a first lighting element 18A and a second lighting element 18B. Therein, the first lighting element 18A and the second lighting element 18B may emit light with a different color. Similar to the embodiments described before, the diffusor 14 may comprise a stub 28. However, in the embodiment of FIG. 5, the stub 28 may comprise a recess 30. Therein, the recess 30 coincides with the combined or cumulative area of the light emitting surfaces of the light emitting elements 18A, 18B. Thus, by the stub 28 and the recess 30, extensions 32 are built which serve as mixing extensions and mix the light of the individual light emitting elements 18A, 18B and suppress bright spots at the front face of the diffusor 14 irrespective of the origin of the light.

Hence, by the present invention a compact lighting element is provided providing a uniform luminance appearance at its front face at same small building height. The lighting element can be used in a versatile manner providing automotive manufacturer sufficient degree of freedom to create their signature illumination at the front grill of the automobiles despite the limited building space.

The invention claimed is:

1. A lighting element for an automobile, the lighting element comprising:

a mixing box comprising a backwall and sidewalls extending from the backwall;

at least one light emitting element, extending through an opening of the backwall; and a diffusor connected to the mixing box opposite to the backwall and having a front face facing away from the backwall and an opposite back face facing in the direction of the backwall, wherein the diffusor receives light from the at least one light emitting element via its back face and emits light via its front face, wherein the back face of the diffusor extends towards the backwall of the mixing box, and wherein the light emitted via the front face of the diffusor is non-symmetric.

2. The lighting element according to claim 1, wherein the back face is distant of the backwall.

3. The lighting element according to claim 1, wherein two or more light emitting elements are present, wherein at least two light emitting elements emit light with a different color.

4. The lighting element according to claim 1, wherein the front face of the diffusor is flat.

5. The lighting element according to claim 1, wherein the diffusor comprises a stub extending from the back face towards the at least one light emitting element.

6. The lighting element according to claim 5, wherein the stub has a rectangular shape.

7. The lighting element according to claim 5, wherein a shape of the stub corresponds to the shape of the light emitting surface of the at least one light emitting element.

8. The lighting element according to claim 5, wherein the cross-sectional area of the stub is between 0.8 to 1.5 times the area of the light emitting surface of the at least one light emitting element.

9. The lighting element according to claim 8, wherein the cross-sectional area of the stub is between 1 and 1.2 times the area of the light emitting surface of the at least one light emitting element.

10. The lighting element according to claim 5, wherein the stub has a recess directly above the light emitting surface of the at least one light emitting element.

11. The lighting element according to claim 1, wherein the height of the lighting element is smaller than 10 mm.

12. The lighting element according to claim 11, wherein the height of the lighting element is smaller than 5 mm.

13. The lighting element according claim 1, wherein the backwall of the mixing box is reflective.

14. The lighting element according to claim 1, wherein the diffusor comprises a diagonal mirror plane, and the extension of the back face of the diffusor is symmetric along the diagonal mirror plane.

15. The lighting element according to claim 1, wherein at least one of the extension of the back face is asymmetrical along two or more lateral directions or the extension of the back face is symmetric along only one lateral direction.

16. The lighting element according to claim 1, wherein the extension of the back face is defined by one or more splines.

17. The lighting element according to claim 16, wherein the one or more splines comprises five splines or eight splines.

* * * * *